United States Patent [19]
Mausser

[11] 3,868,028
[45] Feb. 25, 1975

[54] GRAIN DISTRIBUTOR
[76] Inventor: Robert Mausser, Walker, Iowa 52352
[22] Filed: Jan. 19, 1973
[21] Appl. No.: 325,207

[52] U.S. Cl.............................. 214/17 C, 302/60
[51] Int. Cl............................................. B65g 65/30
[58] Field of Search............ 214/17 C, 17 CB, 35 R; 193/3; 198/128; 302/60; 239/665, 666, 681

[56] References Cited
UNITED STATES PATENTS
3,415,504  12/1968  Smith et al......................... 214/35 X
3,576,262  4/1971  Konchesky et al............. 214/17 CB Primary Examiner—Robert G. Sheridan
Attorney, Agent, or Firm—James C. Nemmers; Haven E. Simmons

[57] ABSTRACT

A device for improving the distribution of grain delivered into the top of a grain storage bin. The device is mounted inside the bin directly beneath the discharge end of the grain delivery conveyor and consists of a funnel-shaped hopper positioned above a conical-shaped distribution plate. There are no moving parts in the device. However, the distribution plate includes overlapping lower sections that are adjustable so that the angle of the plate can be varied to change the distribution pattern within the bin.

4 Claims, 4 Drawing Figures

PATENTED FEB25 1975  3,868,028.

GRAIN DISTRIBUTOR

BACKGROUND OF THE INVENTION

After grain has been harvested, it is a common practice to deliver the grain for storage or drying into closed storage spaces such as silos, bins, and the like. Since these storage silos and hoppers are generally fairly tall, the grain is delivered into the bins through a fill-opening in the top by using a conveyor, such as an auger conveyor, which will move the grain from the wagon to the top of the bin. If no distribution device is employed, the grain will drop through the fill-opening and tend to pile up in uneven piles along the bottom of the bin. Sometimes the grain is moved around and distributed manually by someone inside of the bin. Where this is not possible or is undesirable, devices can be installed near the top of the bin to uniformly distribute the grain. The prior art discloses a number of such devices, many of which have continuously moving parts and therefore present maintenance problems, and because of the corrosive atmosphere that develops in many of the storage bins, such devices have a relatively short life. Other simplified devices using a grain distributor plate do not uniformly distribute the grain; and as a result, hot spots can develop. There is therefore a need for a very simple, inexpensive, maintenance-free device which will in fact uniformly distribute the grain and thus eliminate the problems associated with uneven distribution.

SUMMARY OF THE INVENTION

The device of the invention consists of a funnel-shaped upper portion which provides a hopper that receives the grain from the conveyor at the top of the bin directly beneath the fill-opening. This upper portion is mounted above a lower portion which is conical-shaped and which has a small opening centrally located in the top. The grain discharged through the fill-opening of the bin falls into the funnel-shaped upper portion and then downwardly onto the lower conical portion. The lower portion has overlapping sections which are adjustable so as to distribute the grain outwardly in all directions and also into the center of the bin through the central opening.

DESCRIPTION OF THE PREFERRED EMBODIMENT

Figure 1:
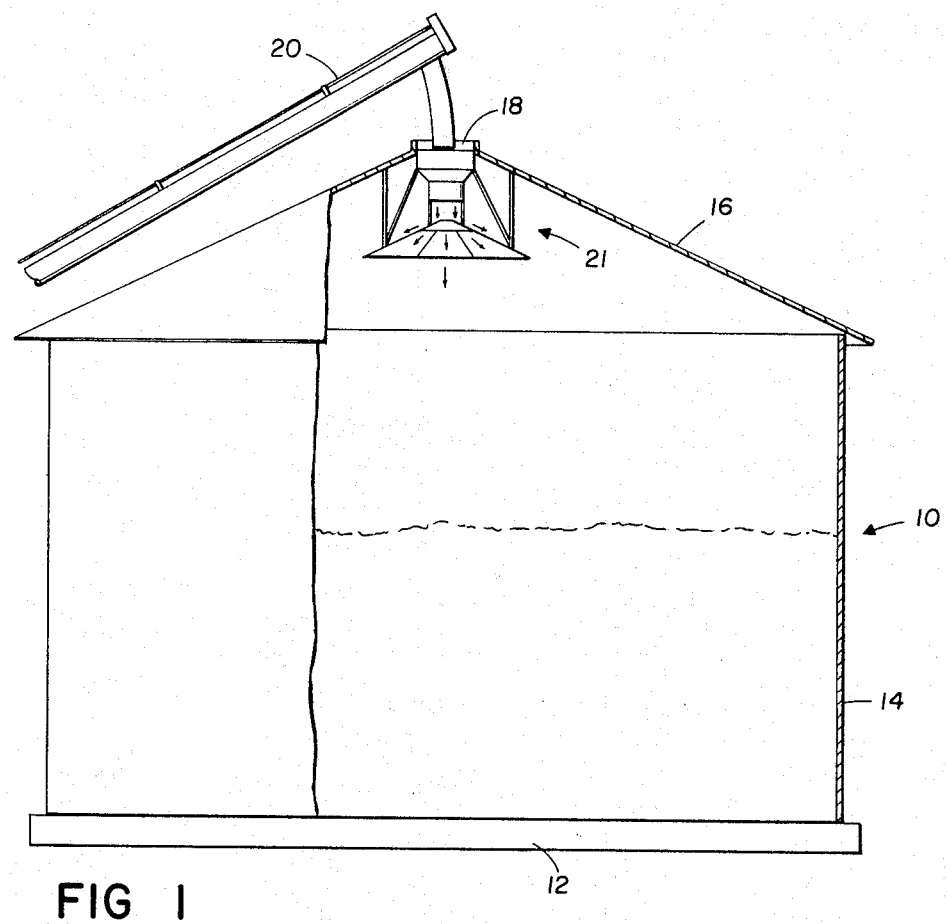
FIG. 1 is an elevational view, partly in section, of a grain storage bin with the grain distribution device of the invention mounted at the top.
Figure 2:
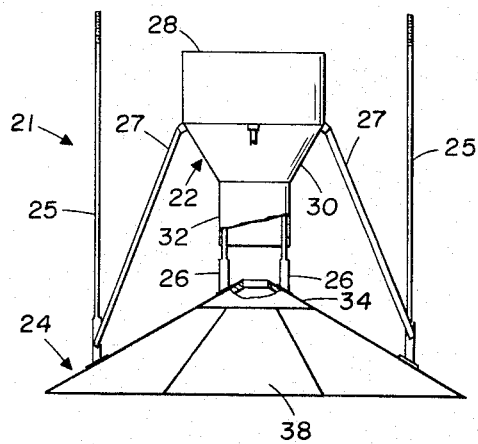
FIG. 2 is an enlarged elevational view, partly in section, of the grain distribution device of the invention.
Figure 3:
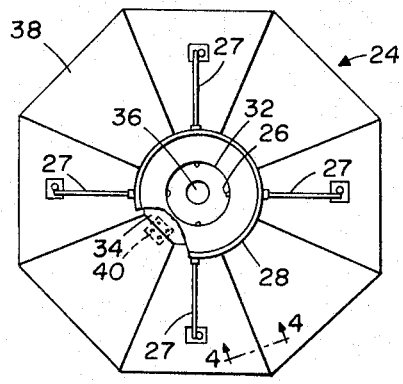
FIG. 3 is a top or plan view of the device of FIG. 2.

Referring to the drawings, there is shown a storage bin 10 for grain or other granular type material. The bin 10 has a foundation 12 supporting a sidewall 14 and is enclosed by a top wall or roof 16 which has a fill-opening 18 centrally located therein. Grain or other material to be fed into the bin 10 is delivered through a conveyor 20 of any suitable kind such as an auger type conveyor. With the discharge end of the conveyor 20 properly positioned, the grain will be discharged through the fill-opening into the interior of the storage bin 10.

The grain distribution device of the invention is indicated generally by the reference numeral 21 and consists of an upper portion 22 and a conically shaped lower portion 24. The upper portion 22 is mounted in a fixed position relative to lower portion 24, and for this purpose it may be affixed to the lower portion 24 by any suitable means such as brackets 26. The upper portion 22 and lower portion 24 forming the device 21 are suspended inside of the bin 10 directly below the fill-opening 18 by rods 25 which are secured at their lower ends to lower portion 24 and at their upper ends to roof 16. The upper portion 22 may also be affixed in any suitable manner to the roof 16, and braces 27 provide additional support between upper portion 22 and the lower portion 24.

Figure 4:
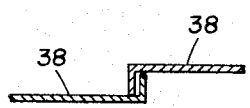
FIG. 4 is a sectional view taken on the line 4—4 of FIG. 3.

The upper portion 22 consists of a hollow cylindrical hopper 28 which receives the grain discharged from conveyor 20. The hopper 28 is joined by a tapered portion 30 to a cylindrical portion 32 from the bottom of which grain is discharged. The lower portion 24 includes a conical-shaped, one-piece top section 34 to the bottom edge of which there are attached a plurality of separate sections 38 each of which is connected to the top section 34 by a hinge 40. The edges of sections 38 overlap each other, and each edge is preferably formed out of the plane of section to engage the oppositely formed edge of the adjacent section 38, as best seen in FIG. 4. This prevents the sections from becoming separated from one another while allowing the sections 38 to move relative to each other as they pivot on their hinges 40. In this way, the amount of flare of the lower section 24 can be changed to vary the distribution of the grain by merely extending or shortening the rods 25 and thereby lowering or raising the sections 38. Also, by disconnecting rods 25 and braces 27 from the sections 38, the sections 38 will pivot downwardly on hinges 40 to collapse the lower section 24. This allows the entire device 21 to be inserted or withdrawn from the bin 10 through the opening 18.

A central opening 36 is provided at the apex or peak of the section 34 of lower portion 24, and the upper portion 22 is mounted in a position relative to lower portion 24 so that the discharge end of the cylindrical portion 32 is centered over the central opening 36. The relative size of the central opening 36 and the diameter of the discharge end of the cylindrical portion 32 are quite critical. For example, I have found that if the diameter of the discharge end of cylindrical portion 32 is 8 inches that the size of the central opening 36 must be precisely 2½ inches in diameter.

Operation of the device should be self-explanatory from the foregoing description. Briefly, however, grain discharged from the conveyor 20 is received in the hopper 28 and by force of gravity passes on down through the tapered portion 30 and the cylindrical portion 32 where a portion of the grain will pass on to the bottom of bin 10 directly through the central opening 36 with the remainder of the grain being deflected outwardly in all directions by the flared sections 38 of the lower portion 24. By thus causing the grain to be deflected in all directions and also by allowing a portion of the grain to drop directly into the central portion of the bin, the grain will be substantially uniformly distributed without any further manual redistribution or without the use of any further devices or equipment in order to mix or stir the grain. I have found that the central opening 36 is essential to this uniform distribution, and that the adjustable sections 38 facilitate use of the device in bins of different sizes.

Although I have described my invention only in connection with the preferred embodiment thereof, disclosed therein, it will be obvious to those skilled in the art that various revisions and modifications can be made to preferred embodiment without departing from the spirit and scope of the invention. It is my intention, however, that all such revisions and modifications as are obvious to those skilled in the art will be included within the scope of the following claims.

I claim:

1. A distribution device for granular material such as grain and the like that is to be stored in a bin having a side wall and a roof with a fill opening providing an enclosed space, said distribution device comprising a hollow upper portion having an inlet opening and a discharge opening beneath said inlet opening, said upper portion providing a flow path for grain between said inlet opening and said discharge opening, a lower portion positioned beneath the discharge opening of the upper portion and having a distribution surface that directs grain discharged from the upper portion outwardly in all directions, said lower portion including a plurality of separate sections, said sections being movable relative to each other to vary the angle of the said distribution surface thereby changing the pattern of distribution of the granular material, said distribution surface of said lower portion having an opening directly beneath the discharge opening of the upper portion, and means mounting said upper portion and said lower portion in a fixed position relative to each other with the distribution surface of the lower portion spaced from the discharge opening of the upper portion.

2. The distribution device of claim 1 in which said lower portion includes a top conical-shaped section, and said plurality of separate sections are pivotally mounted on said top section with the edges of said separate sections overlapping adjacent sections.

3. The distribution device of claim 1 in which the diameter of the discharge opening of said upper portion is approximately three times the diameter of the opening in said lower portion.

4. The distribution device of claim 3 in which said lower portion includes a top conical-shaped section, and said plurality of said separate sections are pivotally mounted on said top section with the edges of said separate sections overlapping adjacent sections.

* * * * *